May 4, 1965
L. J. CASHORE
3,181,354
APPARATUS AND METHOD FOR DETECTING CORD LENGTH
IRREGULARITIES IN CREELS
Filed July 9, 1962
3 Sheets-Sheet 1
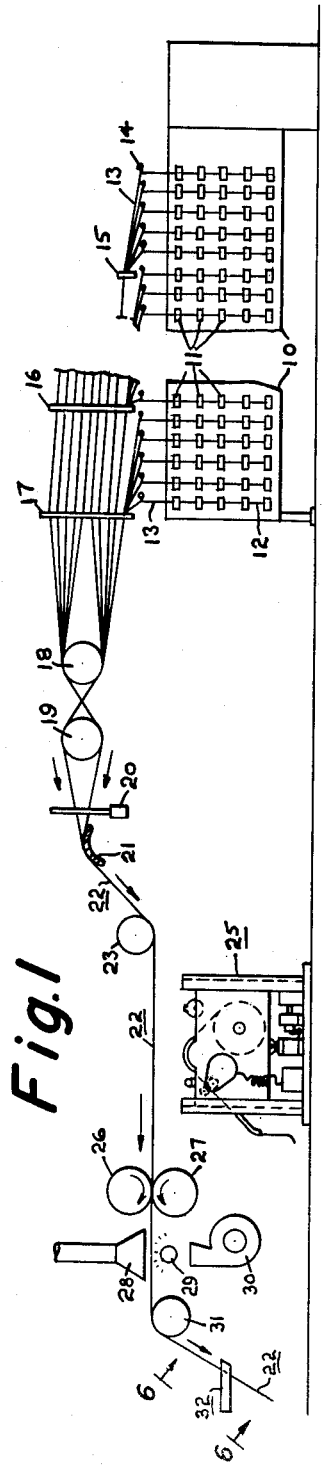
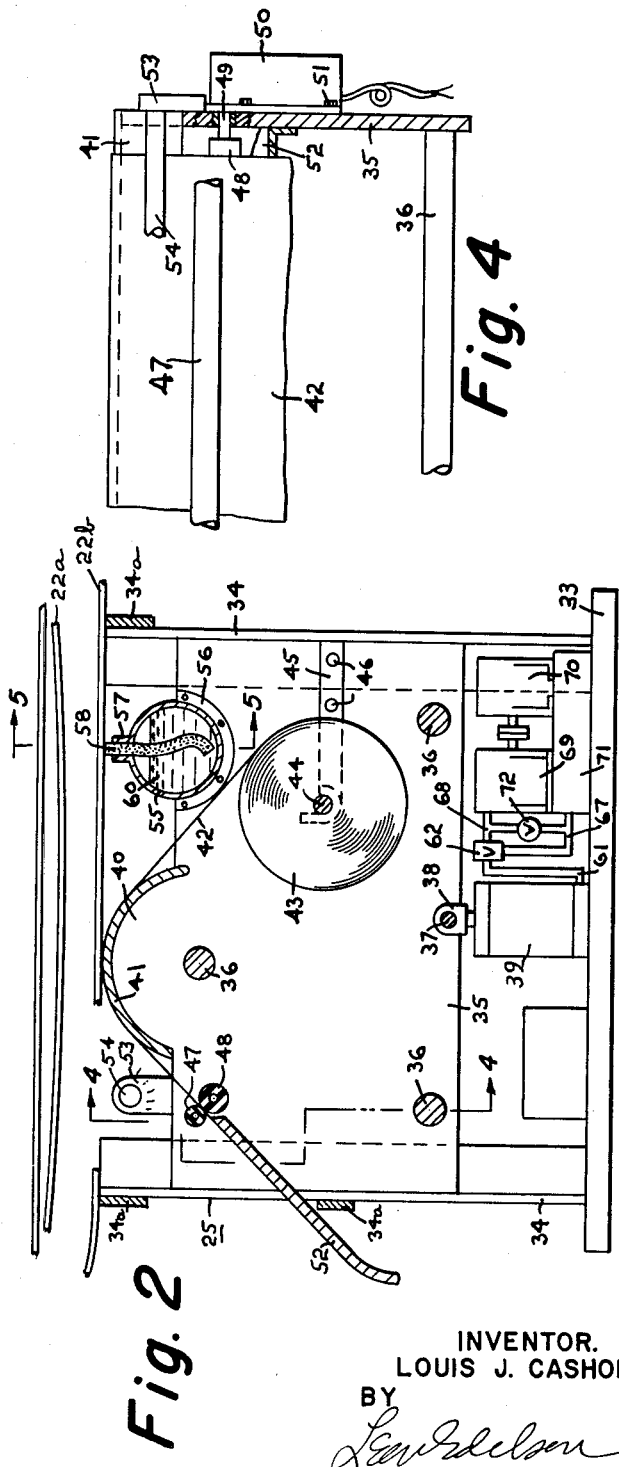
INVENTOR.
LOUIS J. CASHORE
BY
ATTORNEY

INVENTOR.
LOUIS J. CASHORE
BY
ATTORNEY

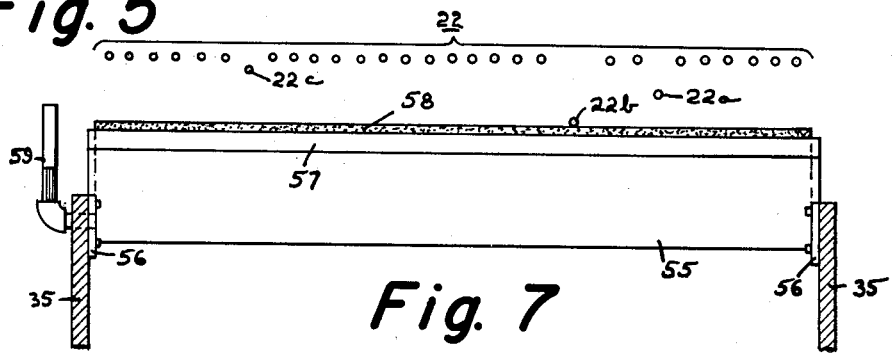
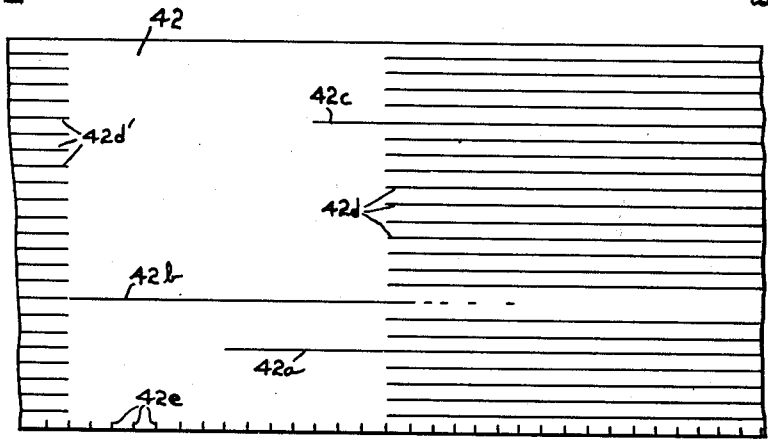
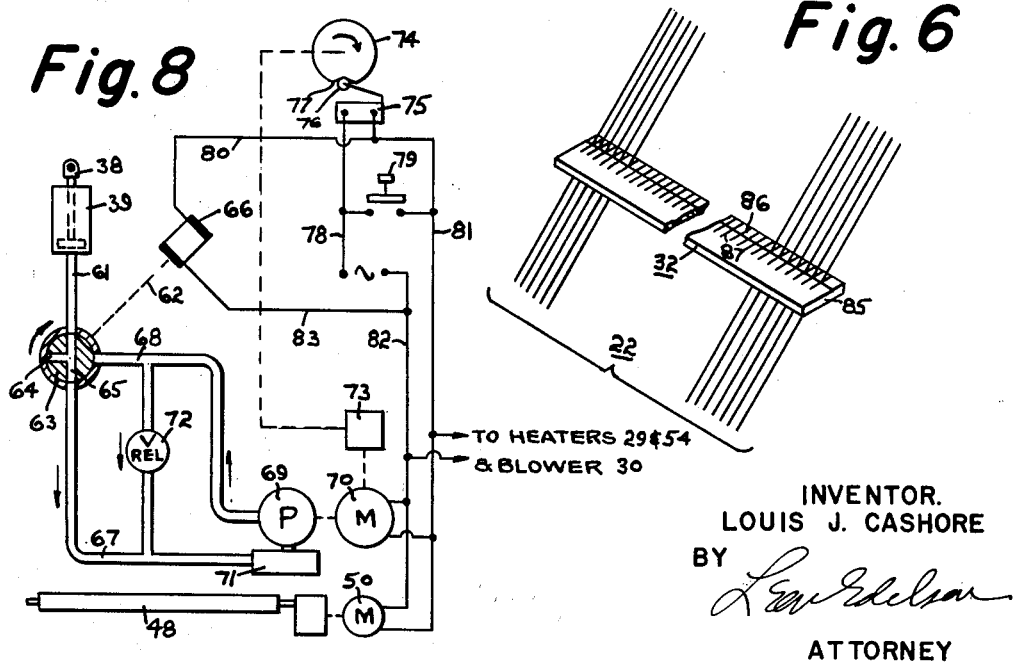
INVENTOR.
LOUIS J. CASHORE
BY
ATTORNEY

United States Patent Office 3,181,354
Patented May 4, 1965

3,181,354
APPARATUS AND METHOD FOR DETECTING CORD LENGTH IRREGULARITIES IN CREELS
Louis J. Cashore, 113 E. 7th Ave., Conshohocken, Pa.
Filed July 9, 1962, Ser. No. 208,339
13 Claims. (Cl. 73—159)

This invention relates generally to apparatus and a method for detecting cord length irregularities in cords drawn through creel structures, and more particularly, provides a means for quickly detecting the presence of sag or breakage of each of the individual cords which are being drawn through the creel structure. The system according to the invention utilizes a device for staining the cords running through the creel structure after the cords have been shifted into a common flat plane, the stain being applied to any cords which lie out of the plane due to cord tension irregularities resulting in slack or broken cords. The stained cords are immediately detectable at an inspection station and steps may be initiated to correct the undesirable condition.

Creels are used for many purposes, as for example in the winding of a multiplicity of separate threads or cords into individual packages, in textile machinery utilized for winding, twisting, weaving, knitting and warping, or in the production of cord reinforced sheets and fabrics made of synthetic and resilient materials such as rubber. Cord reinforced rubber fabrics are frequently used in the manufacture of devices subjected in use to severe mechanical strain such as power transmission belts, conveyor belts and rubber tires. The reliability and freedom from failure of these devices is greatly dependent upon the strain resistance capabilities of the cord reinforced rubber fabric utilized in the manufacture thereof. Uniformity of quality is therefore important in these materials and is dependent to an important degree upon the uniformity of tension in the reinforcing cords distributed throughout the material, and the continuity or absence of breaks in the cords.

Cord reinforced rubber fabrics are generally made in a continuous flow type of process in which hundreds of separate cords are drawn from individual supply reels and pass into a creel device which integrates the separate cords into an array which ultimately causes all of the cords to be disposed in side by side parallel arrangement in a common plane several feet in width and moving longitudinally of the cords at relatively high speed. The plane of closely spaced moving cords is then processed by running it through baths of various types in which the rubber is applied to the cord to surround each individual cord and bond it to the cord immediately adjacent thereto. With several hundred cords being drawn through the creel at high speed it is not always possible to detect breakage of an individual cord in the cord plane or sag of any given cord, both of these conditions resulting from improper tension of the cord at some antecedent point in the creel mechanism. A sagging cord or the absence of a cord due to a break will obviously result in weak sections in the finished cord reinforced fabric which will render the finished product in which the cord reinforced fabric is used subject to failure either prematurely or under operating conditions normally well within the capabilities thereof. Accordingly, it is a primary object of my invention to provide a novel method of detecting slack or broken cords which are being drawn through a creel mechanism so that the conditions resulting in such slack or broken cord may be quickly remedied to restore the uniformity of the cord array.

Another object of my invention is to provide a novel method of detecting and identifying slack or broken cords within an array of cords moving at relatively high speed by staining all cords not disposed within the normal confines of the array, those cords positioned most remotely from their normal positions being first stained and with cords lying successively closer to the normal array position being successively stained.

Still another object of my invention is to provide novel apparatus for carrying out my novel method of detecting slack or broken cords as aforesaid.

Yet another object of my invention is to provide novel apparatus for carrying out my novel method of detecting slack and broken cord as aforesaid which also provides a printed record of the cord array which graphically demonstrates the tension condition of all of the cords relative to one another.

The foregoing and other objects of the invention will become apparent from a reading of the following specification in conjunction with an examination of the appended drawings, wherein:

FIGURE 1 illustrates in side elevational diagrammatic form an overall system for taking threads or cords from separate spools and combining the same into a horizontally extending array of closely spaced parallel cords, and the apparatus according to the invention for detecting slack and broken cords;

FIGURE 2 is a vertical sectional view through the cord staining and recording apparatus which forms part of the detection system according to the invention, this device being shown on a smaller scale in FIGURE 1;

FIGURE 4 is an enlarged fragmentary view of the portion of the apparatus utilized to record stain tracks of various cords of the array passing thereover as would be seen when viewed along the line 4—4 of FIGURE 2;

FIGURE 5 is an elevational view of the staining wick and its associated tank used for applying stains to various cords of an array running thereabove and illustrating two slack cords and one broken cord in the above lying array, all as would be seen when viewed along the line 5—5 of FIGURE 2;

FIGURE 6 illustrates an identification device which enables an observer at an observation station to immediately identify the source of origin of any cord in the array so that stained or absent cords may be immediately detected and identified to enable rapid repairs to be made, as would be seen along the line 6—6 of FIGURE 1;

FIGURE 7 illustrates a printed record made upon a paper sheet which indicates graphically the relative heights of the various cords in the array; and FIGURE 8 is a schematic diagram of the hydraulic and electrical system associated with the apparatus of FIGURE 2 by means of which the printed record of the type shown in FIGURE 7 may be automatically made.

In the several figures, like reference characters are used to denote like elements.

Figure 3:
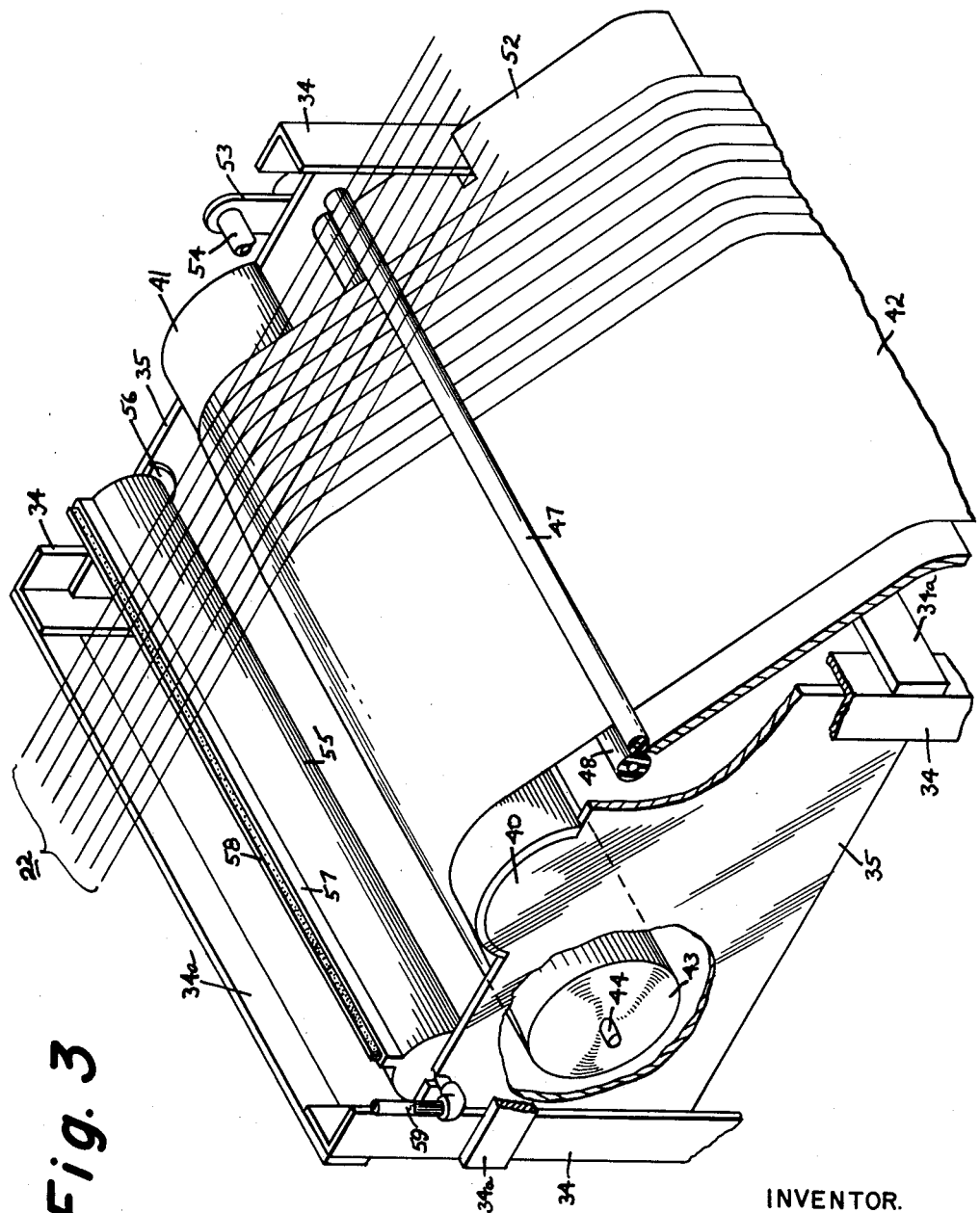
FIGURE 3 is an enlarged fragmentary perspective view of the apparatus shown in vertical section in FIGURE 2.

Turning now to the figures, and referring first to the showing of FIGURE 1, there will be seen at the righthand end of the figure a frame generally designated as 10 upon which are mounted a plurality of cord or thread spools 11. As illustrated, the spools 11 are disposed in vertical rows of five, each spool 11 having led off therefrom its individual cord 12 which extends vertically upward to become one of a group of five such cords designated as 13 which are passed as a group through the guides 14. After passing through the cord guides 14 each cord group 13 is spread horizontally into its five individual single cords and each cord is passed through a perforation in the perforated plate 15 in side by side relationship. This process is continued continuously in a direction from right to left as viewed in FIGURE 1 with additional cord groups being successively added in the manner indicated at the perforated plates 16 and 17. It will be appreciated that at the perforated plate 17, the individual cords 12 are disposed in horizontal planes vertically spaced one above another as a large rectangular array.

This rectangular array of course must be then formed into an in-line single planar array wherein all of the cords are disposed in a common plane in closely spaced side by side relationship. This is carried out by taking half of the cords from the perforated plate 17 and passing them first over a cylindrical roll 18 and then under an adjacent cylindrical roll 19 to a separating comb structure 20 while taking the remaining half of the cords from the perforated plate 17 and passing them under the roll 18 and over the roll 19 to the comb structure 20. By means of the rolls 18 and 19 and the comb 20 the two dimensional or rectangular array of cords emerging from the perforated plate 17 is transformed into an in-line array 22 of closely spaced parallel extending cords disposed in a common plane and moving in sheet fashion. The cord array 22 emerging from the comb 20 passes over the curved skid plate 21 and turns downward beneath the roll 23 and into a horizontal run directly overlying the staining and printing apparatus portion of the invention designated generally as 25. After passing beyond the apparatus 25 the cord array 22 passes between a pair of drying rolls 26 and 27 and through a hot air dryer including the hood 28 heater 29 and blower 30, after which it turns downward over the roll 31 past the inspection station designated generally as 32 and then onward beyond for processing into cord reinforced fabric as previously mentioned.

The creation of the in-line cord array 22 from a multiplicity of individual cords 12 forms no part of this invention because creel structures for so doing are well known in the art. The applicant's invention is therefor concerned essentially with that portion of FIGURE 1 disposed to the lefthand side of the roller 23, the remainder of the figures being concerned with various aspects of the apparatus so located.

As best seen in FIGURES 2, 3 and 4, the staining and printing apparatus 25 comprises a base 33 from which upwardly extend four corner angles 34 rigidly secured to the base 33 and dimensionally stabilized by interconnecting tie members 34a, some of which are visible and others of which have been omitted from the drawings to maintain clarity therein. Disposed within the confines of the corner angles 34 is a movable frame comprising a pair of vertically disposed parallel spaced side plates 35 rigidly tied together by a plurality of heavy tie bars 36 extending transversely therebetween. Also extending transversely between and secured to the side plates 35 proximate the lower edges thereof is a drive bar 37 to which is coupled the piston rod shackle 38 of an underlying hydraulic cylinder 39, the cylinder 39 being also supported directly upon the base 33. The hydraulic cylinder 39 is capable of carrying the full weight of the movable frame and all of the apparatus carried and supported from the latter.

The upper edge of each of the side plates 35 includes an upwardly extending arcuate projection 40 about which is disposed a curved bed plate 41 which extends transversely of the frame to provide a solid underlying support for paper 42 drawn from a roll 43 rotatably supported on shaft 44 by brackets 45 secured to the side plates 35 as by means of the bolts 46. The paper 42 after passing upwardly over the bed plate 41 turns downward between a pair of rollers 47 and 48 which are journalled in the frame side walls 35, the roller 47 being a follower roller while roller 48 is a drive roller having its shaft 49 pass completely through the side wall 35 and into driven engagement with the drive motor speed reducer 50 secured to the side plate 35 as by means of the bolts 51, this arrangement being most clearly shown in FIGURE 4. Extending between and secured to the opposite side plates 35 and extending angularly downward and outward from the nip of the rollers 47 and 48 is a sloping platform 52 over which the paper 42 rides after emerging from the rollers 47 and 48. Also mounted to the side plates 35 just above the roller 47 and 48 are a pair of lamp brackets 53 within which is seated a heat lamp 54 extending transversely of the plane immediately above the paper 42 to thereby throw heat upon the latter before the paper is drawn between the rolls 47 and 48.

Disposed substantially above the location of the paper roll 43 and extending the full width of the frame is the hollow cylindrical tank 55 secured at opposite ends to the side plates 35 by means of the end flanges 56. The top of the tank 55 is fitted with a vertically extending rectangular mouth 57 within which is disposed a wick 58 having its upper edge disposed in a horizontal plane tangent to the crown of the bed plate 41. As best seen in FIGURES 3 and 5, one end of the tank 55 is fitted with a filler pipe 59 through which the tank 55 may be filled with a stain or dye 60 as best seen in FIGURE 2. The filler pipe 59 may be fitted with a viewing glass to show the level of the stain 60 within the tank 55.

Referring back to FIGURE 1, it will be appreciated that the in-line cord array 22 is disposed in a substantially horizontal plane or in a plane which intersects the vertical to a degree sufficient such that any slack which may develop in an individual cord of the array will cause such cord to sag below the plane of the normally tensioned cords of the array. A broken cord will of course also sag first and then drop as the broken end passes the skid plate 21. FIGURES 2 and 5 illustrate the cord array 22, showing most of the cords disposed in the normal common plane but having two cords 22a and 22c disposed below the normal plane in a sagging condition and a third cord 22b actually lying upon the below-disposed staining and printing apparatus 25, and thus representing either an extreme case of sag or a broken cord. For purposes of illustration the cord 22b will be treated as though it were a broken cord as will become subsequently clear in connection with the explanation of FIGURE 7. In order to detect slack cords such as those illustrated at 22a and 22c in FIGURE 5, it is necessary that the staining wick 58 of the apparatus 25 be brought into contact with these cords. This is effected by raising the wick 58 from its lowered position as seen in FIGURE 2 by means of the hydraulic cylinder 39 which supports the movable frame through its piston rod shackle 38 coupled to the drive bar 37 secured to the side plates 35 which carry the wick 58 and paper recording system previously described.

Briefly, the apparatus 25 operates as follows. By actuation of a control, the movable frame begins to move upward at a uniform rate while the paper drive rollers 47 and 48 are simultaneously set in motion by motor 50 to draw paper 42 from the paper roll 43 over the bed plate 41 and downward onto the platform 52. The heat lamp 54 is also energized. As the frame moves upward the wick 58 encounters the sagging cords, the lowest cord being first encountered and others in succession as the wick moves upward, each of the cords thus having stain 60 applied thereto. Since the cords are moving from right to left as viewed in FIGURE 2, or left to right as seen in FIGURE 3, each of the cords which has had stain applied to it passes over the surface of the paper 42 at the crown of the bed plate 41 and thus makes a track on the paper. The stain track on the paper 42 is quickly dried as it passes under the heat lamp 54 before passing between the rollers 47 and 48 to prevent smearing of the track which would occur if the stain were not dry.

The tracks produced on the paper 42 occur only in those cases where a cord has been engaged by the rising wick 58 so that the first cord to produce a track would be a broken cord which would be lying upon the wick 58 even prior to any upward motion of the latter. The next cord to produce a track would be the cord with the greatest degree of sag, to be then followed by cords having successively lesser degrees of sag. This is illustrated in the showing of FIGURE 7 in which it is observed that the track 42b produced by the broken cord 22b is the first cord to produce a track on the paper 42, the second track 42a being produced by the lowest sagging cord 22a while the third track 42c results from the sagging cord 22c which does not have as great a degree of sag as the cord 22a. Since there are no other broken or sagging cords in the array 22 as seen in FIGURE 5, no additional tracks are printed on the paper 42 of FIGURE 7 until the rising wick 58 of the apparatus 25 reaches the plane of the cord array 22. At this time, the wick 58 will engage all of the remaining cords of the array 22 and will print all of the remaining tracks shown on FIGURE 7, these tracks being designated as 42d for purposes of identification.

Since the paper 42 is drawn at a constant speed by the rollers 47 and 48, and since the movable frame is elevated by the hydraulic system at a constant velocity, a given length of the paper 42 will always correspond to a fixed increment of height above the wick 58. For example, if the space between the wick 58 and the plane of cord array 22 were fixed at 3½ inches, and if the interval between adjacent timing marks 42e on the paper 42 represents one quarter inch of elevation then fourteen such intervals will be required to represent 3½ inches. It will be observed in FIGURE 7 that fourteen such intervals are shown between the full track patterns 42d and 42d' which represent contact of the wick 58 with the entire cord array 22. The actual distance between any two timing marks 42e on the paper 42 will of course be determined by the rate at which the paper 42 is drawn for each quarter inch of elevation of the movable frame. Not only does the chart of FIGURE 7 disclose which cords are out of plane with the cord array and which cords are in most serious need of attention, but it also shows precisely how far below the plane of the cord array each of the out of plane cords is located. For example, the track 42c is three timing mark intervals longer than the tracks 42d produced by the array 22 and the cord 22c therefor lies ¾ of an inch below the array. Similarly, the cord 22a is 1¾ inches below the cord array 22 because the track 42a produced thereby is seven timing mark intervals longer than the tracks 42d produced by the cord array.

It will also be observed on FIGURE 7 that the track 42b is not continuous but after being printed for a time then disappears leaving a blank space where normally there would appear a printing track. This condition of course corresponds to the fact that the broken cord 22b moving to the left in FIGURE 1 has passed the location of the apparatus 25 so that there is no longer any cord in that position. Should the break in the cord 22b have occurred some time prior to initiation of the staining and printing operation with the apparatus 25, then it will be appreciated that the track 42b would never have been printed since the trailing end of the broken cord would have passed the apparatus 25. The break in the cord 22b would then only be detected at the time that the wick 58 has risen to the plane of the cord array 22 to thereby print all of the tracks 42d and disclose the absence of any track in the position where the cord 22b would normally lie. It would then be known that cord 22b had broken some time earlier. The apparatus for shifting the staining wick and printing apparatus vertically upward at a uniform rate in order to stain the cords as previously set forth and produce a printed record thereof is shown generally in FIGURE 2 and schematically in the showing of FIGURE 8, to which attention should be now directed.

The hydraulic cylinder 39 is of the single acting type and has an inlet-outlet fed by the hydraulic line 61 connected to the outlet of a solenoid operated valve 62. The solenoid operated valve 62 includes a rotor 63 through which are formed the interconnecting passages 64 and 65, the rotor being stepped between two positions as determined by the state of energization of the solenoid 66. As shown in FIGURE 8, the solenoid 66 is in its deenergized state and the rotor passage 65 of the valve 62 thus interconnects the hydraulic lines 61 and 67 and blocks off any communication between the hydraulic lines 61 and 68.

The hydraulic line 68 connects to the outlet of a pump 69 which is drivable by motor 70 when the latter is energized. The hydraulic line 67 returns to the pump reservoir 71. Connected across the pump 69 between the hydraulic lines 67 and 68 is a relief valve 72.

The pump motor 70 is also coupled through a speed reducer 73 to a cam 74, the cam 74 operating to close a switch 75 when the wheel 76 rides out of the notch 77 formed in the cam periphery and onto the outer surface of the cam 74. The switch 75 remains closed until the cam 74 completes one revolution to thereby allow the wheel 76 to drop into the notch 77 and open the switch 75. One terminal of switch 75 is connected to one side of a source of electrical power via conductor 78, which latter also connects to one side of a manually operable spring return type of switch 79. The other terminal of the switch 75 connects to one side of the solenoid 66 via conductor 80, and also connects to one side of the motors 50 and 70 and the remaining terminal of the switch 79 all via the conductor 81. The motors 50 and 70 are returned to the power source via conductor 82 while the solenoid 66 of the valve 62 is similarly so returned via conductor 83. The heaters 29 and 54 and blower 30 are energizable via conductors 84 from the conductor lines 81 and 82.

As shown in FIGURE 8 the switches 75 and 79 are open so that the motors 50 and 70 and solenoid 66 are in deenergized condition. The pump 69 is thus inactive and is disconnected from the hydraulic cylinder 39 by virtue of the position of the rotor 63 of valve 62. The hydraulic cylinder 39 is connected to the reservoir 71 by rotor passage 65 of valve 62 which interconnects the hydraulic lines 61 and 67 so that the cylinder piston at its bottommost position and the entire movable frame of the apparatus 25 of FIGURE 2 is at its bottom or reference position. The paper 42 from the paper roll 43 is also motionless since its driving rolls 47 and 48 are not being driven by the inactive motor 50.

When now it is desired to cause the cords of the array 22 to be stained and to make a print of the relative positions of the cords, the switch 79 may be momentarily closed by hand to thereby energize the motors 50 and 70. Energization of the motor 70 starts the pump 69 and rotates the cam 74 through its reducer 73 to thereby close switch 75 and energize solenoid 66 of the valve 62. Energization of the solenoid 66 causes the rotor 63 of valve 62 to rotate clockwise through 90° to thereby interconnect hydraulic lines 68 and 61 via rotor passages 65 and 64, simultaneously breaking the connection between hydraulic lines 61 and 67. Simultaneously, the motor 50 starts the paper 42 moving through the drive roll 48 and follower roll 47 while the blower 30 and heaters 29 and 54 are also at this time energized. Closure of the switch 75 bypasses the switch 79 which may be then released. Fluid pressure from the pump 69 elevates the piston of the hydraulic cylinder 39 at a constant speed so that the staining wick 58 moves upward at a fixed rate. Upward motion of the wick 58 and printing paper bed plate 41 terminates when the piston of the hydraulic cylinder 39 reaches the top of its excursion, the pressure in line 68 thereupon increasing rapidly until the opening pressure of the relief valve 72 is reached, whereupon the hydraulic fluid from the pump 69 bypasses back to the reservoir 71 through the relief valve 72 while maintaining the piston of the cylinder 39 in its top position. This top position of the cylinder piston is chosen to be that at which the wick 58 contacts all of the cords in the normal plane of the cord array 22 so that it is in this position that the tracks 42d will be printed on the paper 42 of FIGURE 7.

The rate of rise of the piston of cylinder 39 is chosen so that the piston will reach its top position before the cam 74 has completed one revolution. Alternatively, of course, the same result may be achieved by proper choice of speed reducer 73 in relation to the rate of rise and total throw of the piston of the cylinder 39. In either case, when the cam 74 completes one revolution the wheel 76 drops into notch 77 and opens switch 75 thus deenergizing motors 50 and 70, solenoid 66, blower 30 and heaters 29 and 54. De-energization of the motor 50 stops the motion of the paper 42 while de-energization of the motor 70 cuts off the pump 69, and de-energization of solenoid 66 allows the rotor 63 of valve 62 to counter-rotate and reconnect hydraulic line 61 to line 67 via rotor passage 65. The mass load coupled to the piston of hydraulic cylinder 39 thus forces the piston down within the cylinder and returns the hydraulic fluid therein back to the reservoir 71. The entire movable frame of the apparatus 25 of course then descends to its original position below the plane of the cord array 22, as shown in FIGURES 1, 2 and 5.

Other types of drive systems might be employed if desired. For example, a hand crank could be utilized in place of the hydraulic elevating mechanism and might be useful in monitoring a particular elevation below the plane of the cord array 22. In such a case, the entire movable frame could be elevated to its desired position and held there, the subsequent appearance of any stained cords thereby indicating that one or more cords have dropped to the level being monitored. In this case the paper printing aspect of the apparatus 25 might be dispensed with and a monitor could be stationed at an observation point such as at the inspection station 32 shown in FIGURES 1 and 6.

The inspection station 32 may be a board 85 extending transversely of the cord array 22 provided with guides 86 within which the individual cords of the array 22 are disposed. Each such guide may have associated with it a marked index 87 which designates the particular spool 11 from which that cord is drawn and also therefore identifies the course of travel of the particular cord. Thus, when the cord staining process is being carried out, an observer at the inspection station 32 may quickly identify precisely which cord or cords have been stained by means of the indices 87, and may report this information immediately to service personnel who may then remedy the condition causing the cord sag.

The rolls 26 and 27 shown in FIGURE 1 are absorbent drying rolls which pick up any excess stain adhering to the cords of the array 22. After emerging from the rolls 26 and 27 the cord array 22 is subjected to hot air drying from the heat lamp 29 and blower 30 so that by the time the cord array arrives at its processing point there is no residual fluid stain on the cord.

Having now described my invention in connection with a particularly illustrated embodiment thereof, it will be appreciated that variations and modifications of the same may now occur from time to time to those persons normally skilled in the art without departing from the essential scope or spirit of my invention. For example, the switch 79 of FIGURE 8 could readily be replaced with a cyclically operating timer so that prints as shown in FIGURE 7 would be automatically made at selected timed intervals. Also, it is not mandatory that the wick 58 be located at the position shown in FIGURE 1, but could be located at other points in the creel mechanism. For example a staining wick could be positioned to underlie each horizontal array of cords passing through a perforated guide plate such as that shown at 17 in FIGURE 1. Accordingly, it is intended to claim the invention broadly as well as specifically as indicated by the appended claims.

What is claimed as new and useful is:

1. A method of marking out of plane cords in an array of moving cords normally disposed in parallel extending fashion in a common plane which intersects the vertical to a substantial degree, consisting of the steps of, disposing a cord marking medium beneath the cord array common plane in non-contacting spaced parallel relation thereto across the full transverse span of said cord array so that any cord which drops below the normal common plane of said cord array contacts said medium and is marked thereby to indicate an abnormal condition thereof.

2. A method of detecting out of plane cords in an array of moving cords normally disposed in parallel extending fashion in a common plane which intersects the vertical to a substantial degree, consisting of the steps of, disposing a cord marking medium beneath the cord array common plane in non-contacting spaced parallel relation thereto across the full transverse span of said cord array so that any cord which drops below the normal common plane of said cord array contacts said medium and is marked thereby to indicate an abnormal condition thereof, and examining the moving cord array to detect the presence of individual marked cords thereof.

3. A method of detecting out of plane cords in an array of moving cords normally disposed in transversely spaced, parallel relation in a common plane which intersects the vertical to a substantial degree, consisting of the steps of disposing a cord marking medium beneath the moving cord array common plane in non-contacting spaced relation thereto so as to underlie all cord positions of the cord array, moving the cord marking medium toward the moving cord array common plane to thereby contact and mark any cords lying out of the common plane before contacting the cords disposed within the common plane, and examining the moving cord array to detect the presence of individual marked cords thereof.

4. A method of detecting out of plane cords in an array of moving cords normally disposed in transversely spaced, parallel relation in a common plane which intersects the vertical to a substantial degree, consisting of the steps of disposing a cord marking medium beneath the moving cord array common plane in non-contacting spaced relation thereto so as to underlie all cord positions of the cord array, uniformly moving the cord marking medium toward the common plane of the moving cord array to thereby contact and mark only such cords of the array as fall below said common plane, and examining the moving cord array to detect the presence of individual marked cords thereof.

5. The method as set forth in claim 3 wherein the cord marking medium marks the cord with an optically visible agent.

6. A method of detecting and recording the occurrence of out of plane cords in an array of moving cords normally disposed in transversely spaced, parallel relation in a common plane which intersects the vertical to a substantial degree, consisting of the steps of disposing a cord marking medium beneath the moving cord array common plane in non-contacting spaced relation thereto so as to underlie all cord positions of the cord array, moving the cord marking medium toward the moving cord array common plane to thereby contact and mark only such cords of the array as fall below said common plane, and engaging each marked cord with a recording medium to which the cord marking is transferred to thereby provide a visible record indicating the presence and position in the array of all such marked fallen cords.

7. Apparatus for marking out of plane cords in an array of moving cords normally disposed in transversely spaced, parallel relation in a common plane which intersects the vertical to a substantial degree, comprising cord marking means disposed beneath the cord array common plane in non-contacting spaced parallel relation thereto and extending across the full transverse span of said cord array, whereby, when said cord marking means is so disposed, any cord which falls below the normal common plane of said cord array contacts said medium and is marked thereby to indicate an abnormal condition thereof.

8. Apparatus for detecting out of plane cords in an array of moving cords normally disposed in transversely spaced, parallel relation in a common plane which intersects the vertical to a substantial degree comprising cord marking means disposed beneath the cord array common plane in non-contacting spaced parallel relation thereto and extending across the full transverse span of said cord array, whereby, when said cord marking means is so disposed, any cord which falls below the normal common plane of said cord array contacts said medium and is marked thereby to indicate an abnormal condition thereof, and means underlying the moving array of cords for receiving and recording marks transferred thereto by the marked fallen cords and thereby indicate the existence of the latter.

9. Apparatus for detecting out of plane cords in an array of moving cords normally disposed in parallel extending fashion in a common plane which intersects the vertical to a substantial degree comprising cord marking means disposed beneath the cord array common plane in non-contacting spaced parallel relation thereto and extending across the full transverse span of said cord array, whereby, when said cord marking means is so disposed, any cord which falls below the normal common plane of said cord array contacts said medium and is marked thereby to indicate an abnormal condition thereof, and indicating means positionable proximate the cord array for identifying each of the fallen cords in the array.

10. Apparatus for detecting out of plane cords in an array of moving cords normally disposed in parallel extending fashion in a common plane which intersects the vertical to a substantial degree, comprising, in combination, cord marking means disposed beneath the cord array common plane in uniformly spaced relation to all normal cord positions of the cord array, and means for adjustably positioning said cord marking means to predetermined spaced relation beneath the cord array common plane, whereby, as the cords of said array move across said marking means all cords thereof which fall out of said array to a predetermined extent contact and are drawn over said marking means and are marked thereby.

11. Apparatus for detecting out of plane cords in an array of moving cords normally disposed in parallel extending fashion in a common plane which intersects the vertical to a substantial degree comprising, in combination, cord marking means disposed beneath the cord array common plane in uniformly spaced relation to all normal cord positions of the cord array, means for positionally adjusting said cord marking means in predetermined spaced relation beneath the cord array common plane whereby, as the cords of said array move across said marking means, all cords thereof which fall out of said array to a predetermined extent contact and are drawn over said marking means and are marked thereby, and means operative to automatically record the fallen marked cords as said cord array moves across said marking means.

12. Apparatus for detecting out of plane cords in an array of moving cords normally disposed in parallel extending fashion in a common plane which intersects the vertical to a substantial degree, comprising, in combination, cord marking means disposed beneath the cord array common plane in uniformly spaced relation to all normal cord positions of the cord array, means for positionally adjusting said cord marking means in predetermined permissible deviation below the normal plane of the array, and recording means operative as said array of cords traverses said cord marking means for recording the presence and position in the array of all cords marked by said marking means.

13. Apparatus for detecting out of plane cords in an array of moving cords normally disposed in a common plane which intersects the vertical to a substantial degree comprising, in combination, cord marking means disposed beneath the cord array common plane in uniformly spaced relation to all normal cord positions of the cord array, recording means operative as said array of cords traverses said cord marking means for recording and providing a visible indication of the existence and location in the array of all cords which are displaced from their normal position in the array, means for simultaneously moving said cord marking means and said recording means toward the cord array common plane to thereby cause said marking means to sequentially contact and mark all of the cords which are variously displaced below the normal common plane thereof and record in the order of their magnitude of displacement the existence and location in the array of all of the marked cords.

References Cited by the Examiner
UNITED STATES PATENTS

| | | | |
|---|---|---|---|
| 2,513,432 | 7/50 | Sisson | 28—75 |
| 2,788,562 | 4/57 | Wagner | 28—22 |
| 3,056,289 | 10/62 | Epstein | 73—160 |

ISAAC LISANN, *Primary Examiner*.

LEONARD FORMAN, *Examiner*.